US007720018B2

(12) United States Patent
Hassan et al.

(10) Patent No.: US 7,720,018 B2
(45) Date of Patent: May 18, 2010

(54) LOW POWER TRANSMISSION PROVISIONING FOR WIRELESS NETWORK DEVICES

(75) Inventors: Amer A. Hassan, Kirkland, WA (US); Abhishek Abhishek, Woodinville, WA (US); Christopher J. Corbett, Duvall, WA (US); Christian Huitema, Clyde Hill, WA (US); David A. Roberts, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 920 days.

(21) Appl. No.: 11/112,241

(22) Filed: Apr. 21, 2005

(65) Prior Publication Data

US 2006/0239217 A1 Oct. 26, 2006

(51) Int. Cl.
*G08C 17/00* (2006.01)
(52) U.S. Cl. ...................................... 370/311; 455/522
(58) Field of Classification Search ................ 370/254, 370/255, 328, 329, 332, 311; 713/1, 2, 100, 713/300–340; 455/127.1, 127.5, 522
See application file for complete search history.

(56) References Cited

U.S. PATENT DOCUMENTS

| 5,610,969 | A | * | 3/1997 | McHenry et al. ......... 455/435.2 |
| 5,909,429 | A | | 6/1999 | Satyanarayana et al. |
| 6,029,147 | A | | 2/2000 | Horadan et al. |
| 6,791,581 | B2 | | 9/2004 | Novak et al. |
| 6,894,994 | B1 | * | 5/2005 | Grob et al. .................. 370/335 |
| 7,079,494 | B2 | * | 7/2006 | Marinier et al. ............. 370/252 |
| 7,346,364 | B1 | * | 3/2008 | Tsien et al. ................. 455/522 |
| 2001/0011023 | A1 | | 8/2001 | Nishioka et al. |
| 2003/0101190 | A1 | | 5/2003 | Horvitz et al. |
| 2003/0115267 | A1 | | 6/2003 | Hinton et al. |
| 2004/0002352 | A1 | | 1/2004 | Sendonaris |
| 2004/0111520 | A1 | | 6/2004 | Krantz et al. |
| 2004/0162059 | A1 | * | 8/2004 | Hiltunen et al. .......... 455/412.1 |
| 2004/0174833 | A1 | * | 9/2004 | Raith ........................ 370/311 |
| 2004/0203989 | A1 | * | 10/2004 | Karaoguz .................... 455/522 |
| 2005/0018686 | A1 | | 1/2005 | Garashi et al. |
| 2006/0046692 | A1 | * | 3/2006 | Jelinek et al. ............... 455/411 |
| 2006/0058053 | A1 | * | 3/2006 | Jatschka ..................... 455/522 |
| 2006/0187865 | A1 | * | 8/2006 | Sakai ......................... 370/311 |
| 2008/0039022 | A1 | * | 2/2008 | Wei et al. ..................... 455/69 |

OTHER PUBLICATIONS

International Search Report from International Application PCT/US2006/14928.
Anonymous, "Boingo Wireless™ Launches Pocket Boingo Wi-Fi Software," *News: Infrastructure, Products & Services*, Issue #2002—45, 2 pgs (Nov. 2002) printed at http://www.mobileinfo.com/news 2002/Issue45/Boingo PDA.htm on Dec. 10, 2004.
ECMA International, "Near Field Communication—White Paper," ECMA/TC32-TG19/2004, (9 pages).

* cited by examiner

*Primary Examiner*—Kwang B Yao
*Assistant Examiner*—Kenan Cehic
(74) *Attorney, Agent, or Firm*—Wolf, Greenfield & Sacks, P.C.

(57) ABSTRACT

A process for secure, safe, and easy provisioning of a wireless device with credentials to connect to a wireless network. A connecting wireless device and an established wireless device both utilize low power transmission at close proximity to exchange wireless connection setting information and/or a password. The connecting wireless device is moved into proximity with the established wireless device and a low power setting is discovered at which the wireless devices may communicate with a sufficiently low error rate. The connecting wireless device is then passed the secret information by the established network device.

17 Claims, 10 Drawing Sheets

LOW POWER TRANSMISSION PROVISIONING FOR WIRELESS NETWORK DEVICES

FIELD OF THE INVENTION

This invention pertains generally to computer systems, and, more particularly, to establishing communication with a wireless network.

BACKGROUND OF THE INVENTION

Today, people often use wireless networks within their home so that various electronic devices within the home may communicate with one another without having to wire the devices together. Music, video, financial, and other data are just a few examples of items that may be exchanged through a wireless network in the home.

People utilizing a wireless network demand secure communications. Data exchange between devices should be protected from eavesdropping and impersonation.

One problem with establishing a secure wireless network is that it may be difficult for an end user to configure devices in the home to share wireless network settings, such as a cryptographic (master) key. Often, to establish a network connection, a user has to enter a password and/or other network settings into a new device. Sometimes a user may find it difficult to find such a password and/or settings. Even if found, entering such data into a wireless device or numerous devices may be difficult, because the data to be entered may be significant in length causing users to choose obvious character sequence for a (weak) key vulnerable to a dictionary attack. In addition, many wireless devices often do not include a keyboard or a data entry device that provides simple entry of characters.

BRIEF SUMMARY OF THE INVENTION

This section presents a simplified summary of some embodiments of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In accordance with an embodiment, a process is provided for secure, safe, and easy provisioning of a wireless device with credentials and other settings to connect to a wireless network. The simplest wireless network includes connecting to one other device. The process may also be used to exchange other settings and secret information between wireless devices. In an embodiment, the connecting wireless device and an established (i.e., already connected to the wireless network) wireless device both utilize a very low power transmission to exchange wireless connection setting information and/or a password. Utilizing low power transmission requires very close proximity between the devices to establish a sufficient connection for exchanging the wireless network provisioning information. Because the two devices are required to be in close proximity during provisioning of the wireless connection information, the chances of an eavesdropper intercepting the provisioning information is minimal.

In an embodiment, a wireless device to be connected to a wireless network is moved into proximity with a wireless device already in connection with the network or an access point for the network. After the wireless device is placed in proximity, a low power setting, or whisper mode, is discovered at which the wireless devices may communicate with a sufficiently low error rate to permit transfer of credentials and settings. As an example, the two devices exchange schema to determine low power that is allows for transmission with a sufficiently low error rate. In an embodiment, this power level is the lowest discovered power level that does not produce enough transmission errors to preclude transfer of settings.

In accordance with an embodiment, during the discovery process, feedback may be provided to the user that the devices are not close enough to establish a secure low power connection. After the user moves the devices closer together, the discovery process may begin again.

After whisper mode is established, the wireless device that is being connected is given secret information, such as information regarding wireless network settings. This may involve an exchange between the established network device and the connecting network device, for example with the established network device passing the secret information, and the connecting network device responding with the secret information or a derivative of the secret information. The connecting device may then use this information to connect to the wireless network.

BRIEF DESCRIPTION OF THE DRAWINGS

While the appended claims set forth the features of the invention with particularity, the invention and its advantages are best understood from the following detailed description taken in conjunction with the accompanying drawings, of which:

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details. Furthermore, well-known features may be omitted or simplified in order not to obscure the present invention.

Prior to proceeding with a description of the various embodiments of the invention, a description of the computer and networking environment in which the various embodiments of the invention may be practiced will now be provided. Although it is not required, the present invention may be implemented by programs that are executed by a computer. Generally, such programs include routines, objects, components, data structures and the like that perform particular tasks or implement particular abstract data types. The term "program" as used herein may connote a single program module or multiple program modules acting in concert. The term "computer" as used herein includes any device that electronically executes one or more programs, such as personal computers (PCs), hand-held devices, multi-processor systems, microprocessor-based programmable consumer electronics, network PCs, minicomputers, mainframe computers, consumer appliances having a microprocessor or microcontroller, routers, gateways, hubs, or other electronic devices. The invention may also be employed in distributed computing environments, where tasks are performed by remote processing devices that are linked through a communications network. In a distributed computing environment, programs may be located in both local and remote memory storage devices.

Figure 1:
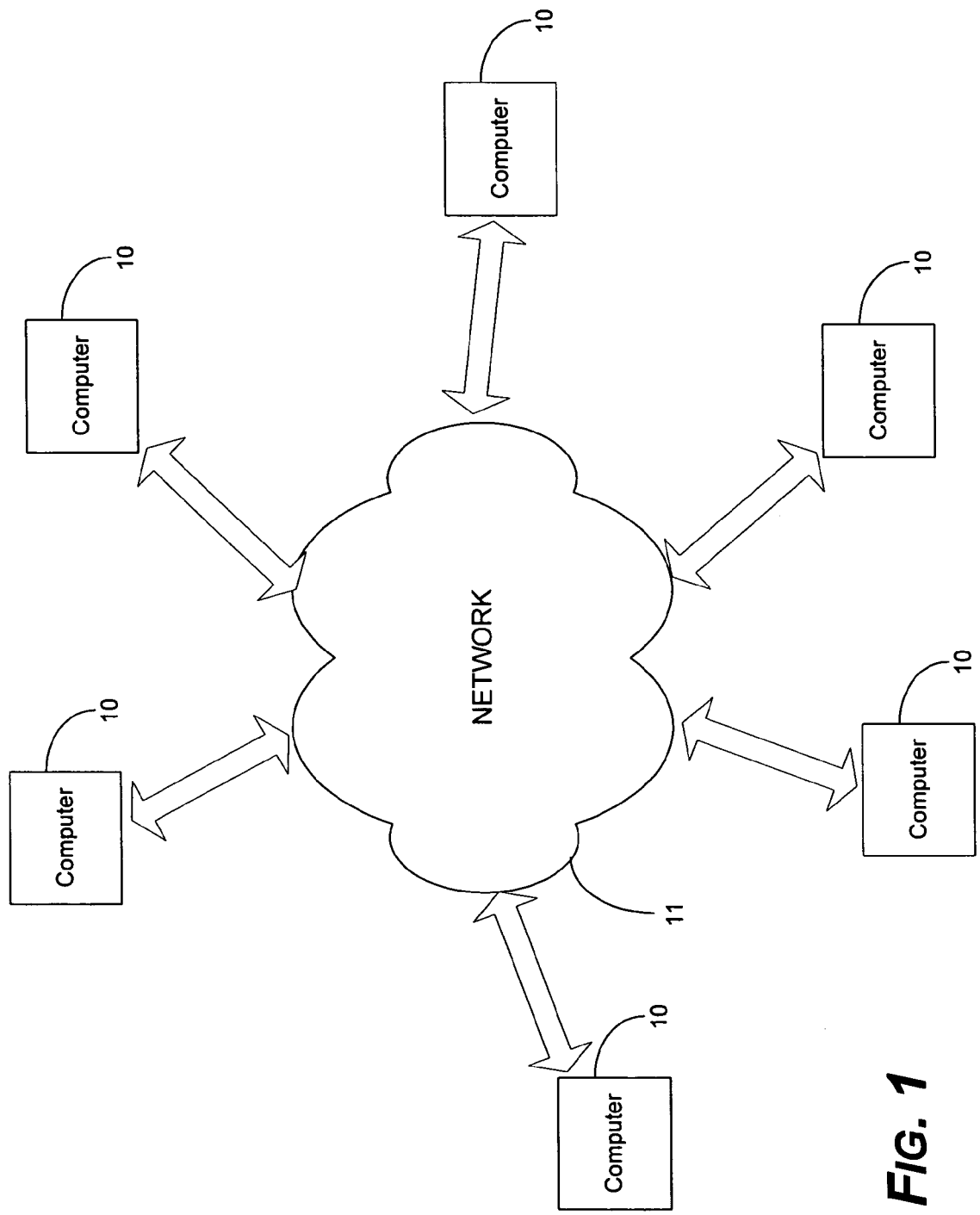
FIG. 1 is a block diagram representing a computer network into which the present invention may be incorporated.

An example of a networked environment in which the invention may be used will now be described with reference to FIG. 1. The example network includes several computers 10 communicating with one another over a network 11, represented by a cloud. The network 11 may include many well-known components, such as routers, gateways, hubs, etc. and allows the computers 10 to communicate.

The present invention has particular application to wireless networks. Thus, for the purposes of this description, the network 11 is presumed to be a wireless network with most computers 10 connected via wireless media, although one or more computers 10 may be connected via wired media.

When interacting with one another over the network 11, one or more of the computers 10 may act as clients, servers or peers with respect to other computers 10. Accordingly, the various embodiments of the invention may be practiced on clients, servers, peers or combinations thereof, even though specific examples contained herein do not refer to all of these types of computers.

Figure 2:
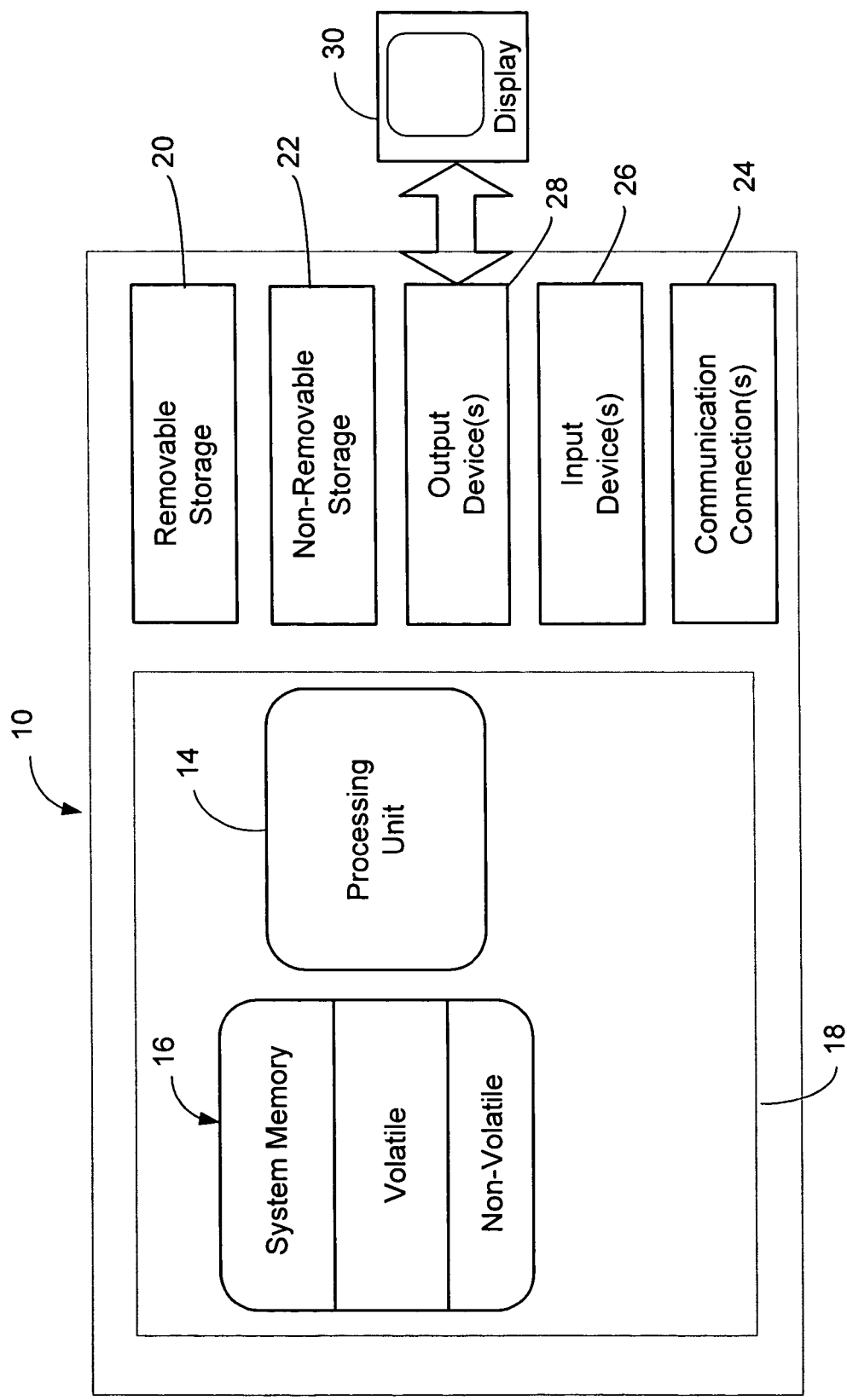
FIG. 2 is a block diagram of an architecture of a computer into which the present invention may be incorporated.

Referring to FIG. 2, an example of a basic configuration for a computer 10 on which all or parts of the invention described herein may be implemented is shown. In its most basic configuration, the computer 10 typically includes at least one processing unit 14 and memory 16. The processing unit 14 executes instructions to carry out tasks in accordance with various embodiments of the invention. In carrying out such tasks, the processing unit 14 may transmit electronic signals to other parts of the computer 10 and to devices outside of the computer 10 to cause some result. Depending on the exact configuration and type of the computer 10, the memory 16 may be volatile (such as RAM), non-volatile (such as ROM or flash memory) or some combination of the two. This most basic configuration is illustrated in FIG. 2 by dashed line 18.

The computer 10 may have additional features and/or functionality. For example, the computer 10 may also include additional storage (removable storage 20 and/or non-removable storage 22) including, but not limited to, magnetic or optical disks or tape. Computer storage media includes volatile and non-volatile, removable and non-removable media implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 10. Any such computer storage media may be part of computer 10.

The computer 10 preferably also contains communications connection(s) 24 that allow the device to communicate with other devices. A communication connection (e.g., one of the communication connections 24) is an example of a communication medium. By way of example, and not limitation, the term "communication media" includes wired media such as a wired network or direct-wired connection, and wireless media such as acoustic, RF, infrared and other wireless media. The term "computer-readable medium" as used herein means computer storage media.

The computer 10 may also have input devices 26 such as a keyboard, mouse, pen, voice input device, touch input device, etc. Output devices 28 such as a display 30, speakers, a printer, etc. may also be included. All these devices are well known in the art and need not be discussed at length here.

The present invention has particular application to connection of a wireless network device to a wireless network, and more specifically to provisioning a wireless network device with information needed to connect to a wireless network. The invention may also be used to exchange secret information between wireless devices. Thus, in accordance with an embodiment, the network 11 shown in FIG. 1 is a wireless network, and the computers 10 are devices either connected to, or attempting to connect to, the wireless network 11. As used herein, for ease of reference and not limitation, a device that is connected to a wireless network such as the network 11 is referred to as an "established network device" and a device attempting to connect to a wireless network is a "connecting network device."

Figure 3:
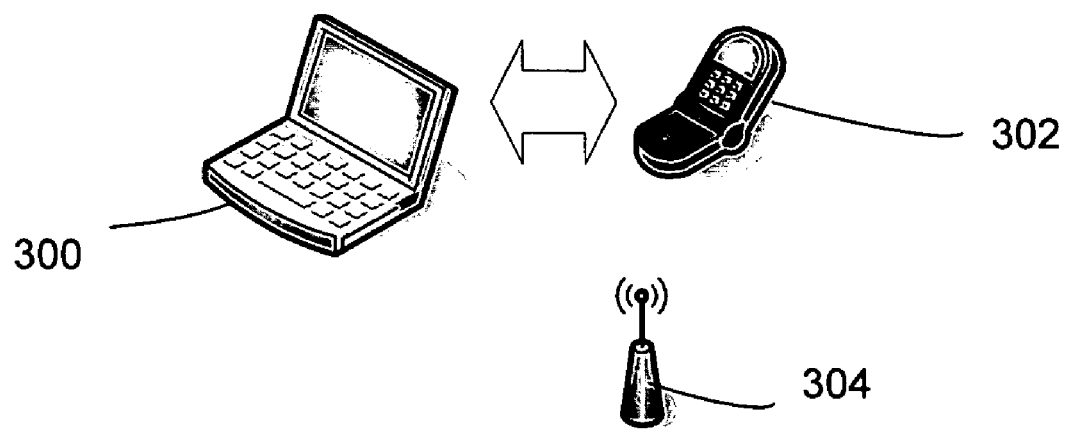
FIG. 3 is a diagram representing a connection being established by a connecting network device, in this example a phone, to an established network device, in this case a notebook computer, in accordance with an embodiment of the invention.
Figure 4:
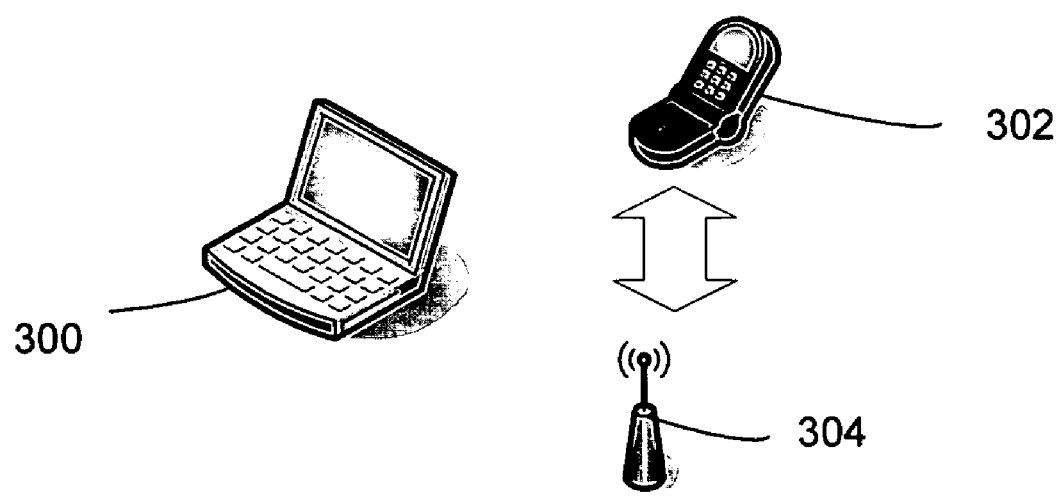
FIG. 4 is a diagram representing connection being established by a connecting network device, in this example a phone, to an access point, in this case an antenna, in accordance with an embodiment of the invention.

An example is shown in FIG. 3, where a notebook computer 300 (e.g., one of the computers 10) is an established network device and a phone 302 is a connecting network device. In accordance with an embodiment, a connecting network device may establish a connection to a wireless network via an established network device, such as the notebook computer 300, such as is shown by the arrow in FIG. 3. As an alternative, a connecting network device, such as the phone 302, may establish a connection with an access point 304 such as is shown by the arrow in FIG. 4. As is known, wireless networks, such as the wireless network 11, typically include one or more access points (APs), such as the access point 304, through which a wireless device, such as the wireless enabled computer 300, may connect to the wireless network. In general, an access point is a structure or node through which a wireless device may access a wireless network. An example is an antenna, although other structures or nodes may be utilized.

Figure 5:
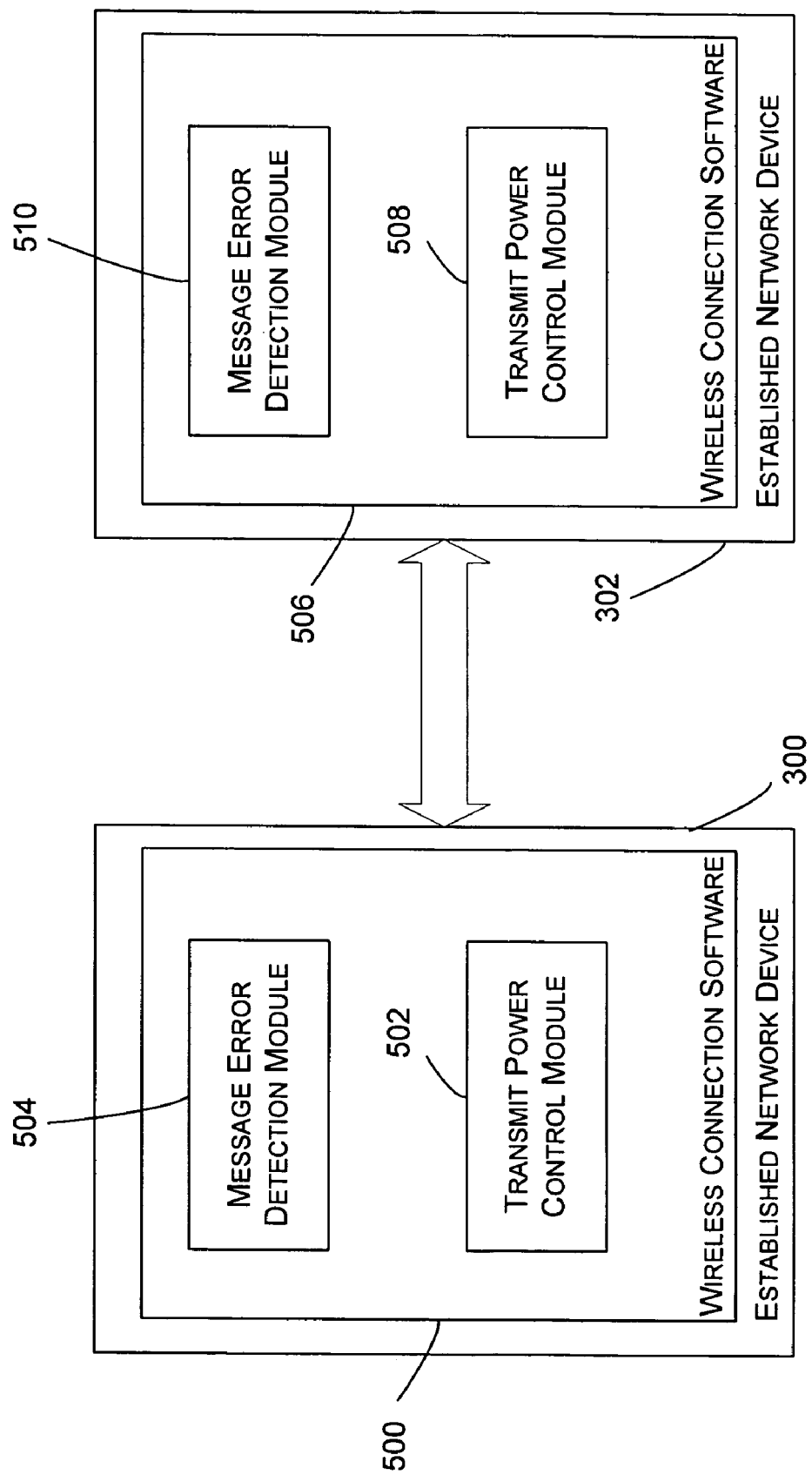
FIG. 5 shows architectures of an established network device and a connecting network device in accordance with an embodiment of the invention.

FIG. 5 shows architectures of an established network device, such as the notebook computer 300, and a connecting network device, such as the phone 302, in accordance with an embodiment of the invention. Each of the devices 300, 302 includes wireless network software 500, 506. In the embodiments shown, the wireless network software 500, 506 each include a transmit power control module 502, 508 and a message error detection module 504, 510.

The transmit power control module 502 or 508 permits a network device, such as the established network device 300 or the connecting network device 302, to reduce or increase radio transmit power. Such function is provided, for example, by the transmit power control (TPC) features of IEEE 802.11h wireless network devices. Transmit power control in IEEE 802.11h wireless network devices can be utilized to reduce interference. Transmit power control in IEEE 802.11h wireless network devices can also be used to manage power consumption of wireless devices and the range between access points of wireless devices. Although TPC in IEEE 802.11h wire network devices is one way of providing the function of the transmit power control modules 502 or 508, other structures or modules may be used.

The message error detection module 504 or 510 is utilized to detect transmission errors from received messages. For example, the message error detection module 510 on the connecting network device 302 may be utilized to determine whether there is an error in a message received from the establish network device 300. As an example, an error may be caused by insufficient power transmission by the sending network device. The message error detection module may need to calculate the error rate associated with the current device positions and power levels to assess if the channel is adequate for transmission of necessary credentials and settings associated with two or more attempts at the same power level and device proximity.

In one embodiment, the message error detection module is a cyclic redundancy check (CRC) detection module. As is known, a cyclic redundancy check is a number derived from, and stored or transmitted with, a block of data in order to detect errors due to corruption of transmitted bits. By recalculating the cyclic redundancy check at the CRC detection module and comparing it to the value originally transmitted, the receiver can detect some types of transmission errors. In the most practical implementation of the embodiment, a CRC detection module consists of a simple division or multiplication of two polynomials derived from received bits and a stored fixed generator polynomial. A zero division remainder means transmission is successful; that is assumed to be error free. A person skilled in the art will be able to implement such a CRC detection module. Although a cyclic redundancy check detection module is described in embodiments herein, other message error detection modules may be used.

Figure 6:
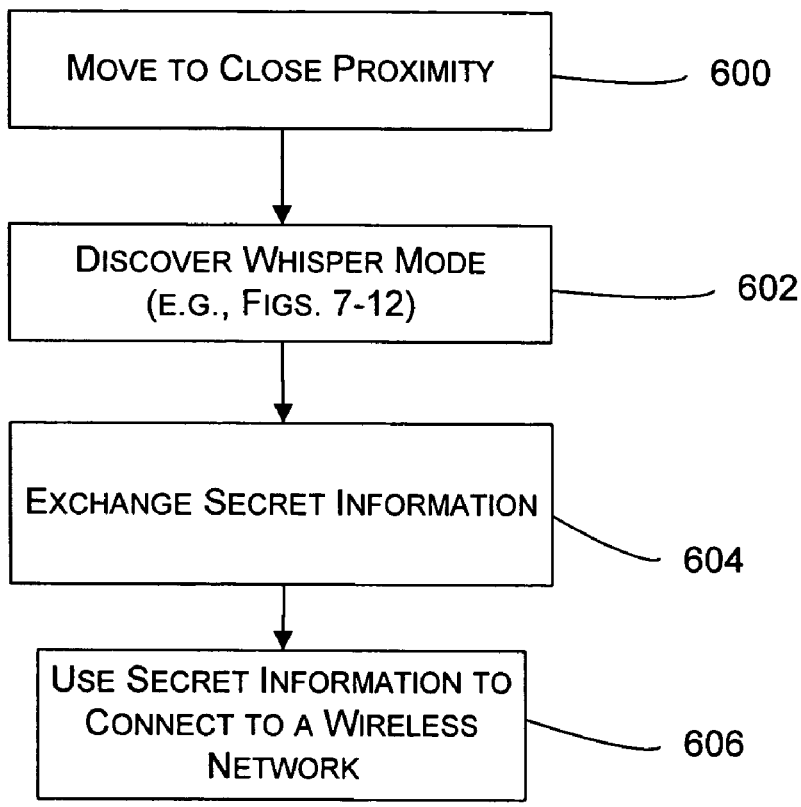
FIG. 6 is a flowchart generally representing steps for provisioning a connecting network device to a wireless network in accordance with an embodiment.

FIG. 6 is a flowchart generally representing steps for provisioning a connecting network device, such as the connecting network device 302, to a wireless network in accordance with an embodiment. Beginning at step 600, the connecting network device 302 is brought into close proximity to an established network device, such as the established network device 300. Alternatively, the connecting network device 302 may be brought into close proximity with an access point, such as the access point 304.

At step 602, low transmit power settings for the connecting network device 302 and the established network device 300 that are sufficient for exchange of messages between the connecting network device 302 and the established network device 300 are discovered for both the connecting network device 302 and the established network device 300. This may include manipulation of transmission power, transmission data rates, modulation schemes, antennae tuning and/or steering, and forward error correction in order to minimize the necessary power per bit arriving at the receiver. Throughout this document, such a low transmit power settings are referred to herein collectively as a "whisper mode." The whisper mode in one embodiment is the lowest discovered transmit power settings for the connecting network device 302 and the established network device 300 in which sufficiently low errors are detected between messages exchanged between the two devices. A setting higher than the lowest discovered settings may be used for whisper mode, but utilizing a lower setting, however, has advantages as are described below. Examples of methods for discovering whisper mode are described with the discussion of FIGS. 7-12.

At step 604, after the whisper mode has been discovered, the connecting network device 302 and the established network device 300 exchange secret information. This secret information may be, for example, network connection settings, a cryptographic key, or another shared secret utilized for normal operations. To this end, the process of FIG. 6 may be utilized for any wireless interface that uses some form of key or shared secret for normal operations, including, but not limited to, 802.11x networks, Bluetooth, and W-USB. Moreover, the process of steps 600-604 may be used to exchange any secret information between devices.

By exchanging secret information at the whisper mode, two wireless devices that need to communicate with each other are both operating at very low transmission power levels when they exchange the information. Thus, the potential of an eavesdropper capturing the information is greatly diminished, especially given the fact that signal strength typically drops greater than the square of the distance between the devices. Thus, if the connecting network device 302 and the established network device 300 are operating at a lowest possible transmit power with sufficiently low errors, a potential eavesdropper would have to be just as close or have significantly more efficient receiver to intercept the transmission. Given the significant drop in signal strength, if the proximity is chosen to be very close (e.g., 1 meter), it is doubtful that an eavesdropper could intercept a message from another room. Thus, the method of the present invention provides a very secure method of exchanging information. Cryptography, such as PKI exchange can also be utilized to further reduce passive eavesdropping of transfer of credentials and settings.

The secret information, once received, may be used for a number of purposes, but in accordance with one embodiment, the secret information is a password and/or other configuration information needed to connect to a wireless network, and is used by the connecting network device 302 to automatically establish a connection to the wireless network (step 606). The connecting network device 302 may be configured to automatically attempt to establish a connection once it has received the secret information, or a user may be requested to approve connection or provide additional information after the secret information is received. However, in an embodiment, the user has no further input and a connection is automatically established after receipt of the secret information. Thus, a user does not have to find and/or enter configuration settings, a password, or other information to establish a connection between the connecting network device 302 and a wireless network.

Figure 7:
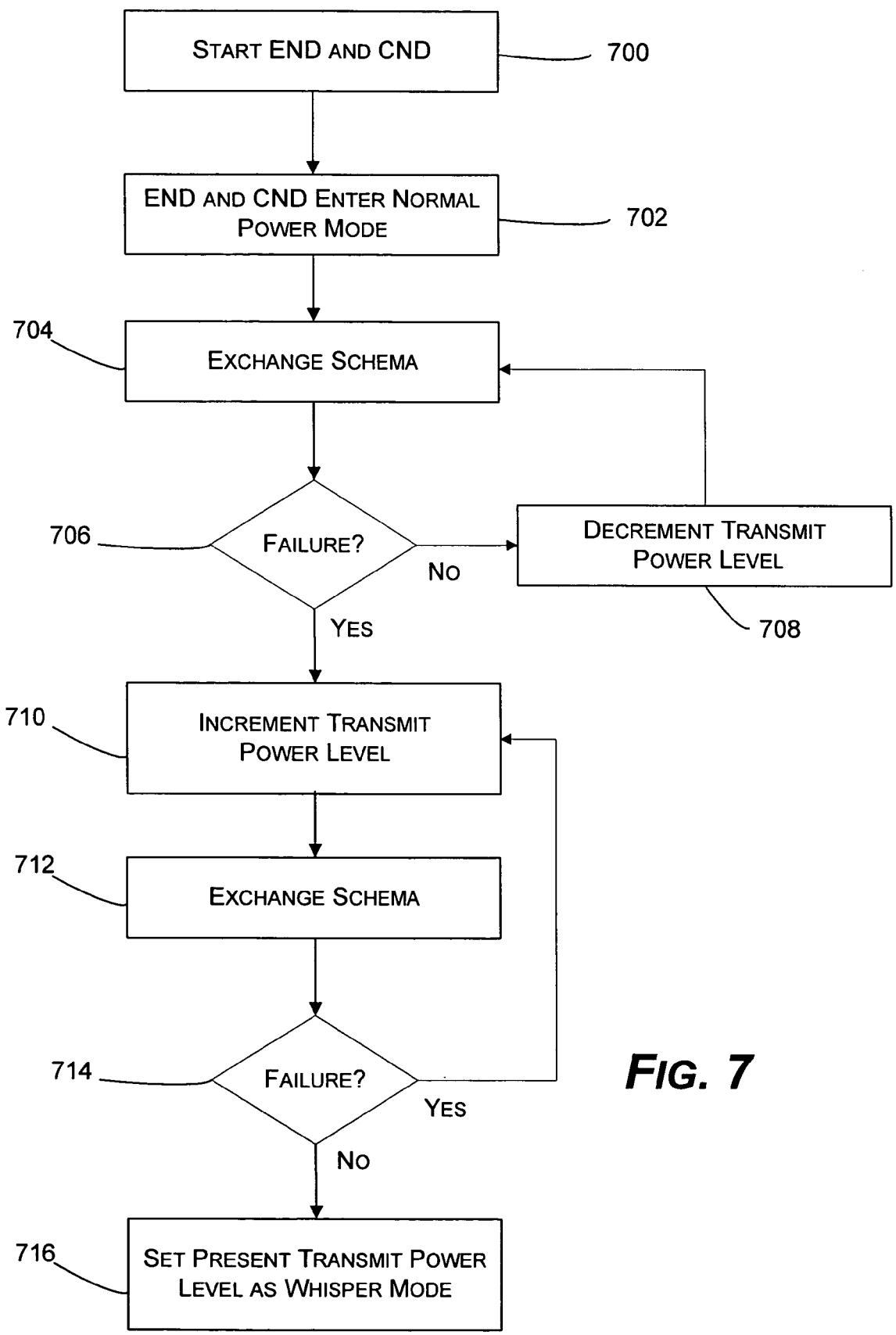
FIG. 7 is a flowchart generally representing steps for discovering whisper mode in accordance with an embodiment of the invention.

FIG. 7 is a flowchart generally representing steps for discovering whisper mode in accordance with an embodiment of the invention. For each of the flowcharts shown in FIGS. 7, 9, and 11, it is assumed that both devices 300, 302 are electronically active at the beginning of the process.

Beginning at step 700, a user selects or otherwise actuates a start sequence for both the established network device 300 (END) and the connecting network device 302 (CND). This may be done, for example, by a special button provided on each of the devices, a key stroke pattern, or some other user input. The start sequence may be different for different types of devices and in some cases devices may initiate the sequence on their own, but a person of skill in the art may provide a user interface or define the actions to start the sequence.

At step 702, the established network device 300 and the connecting network device 302 go into normal power mode, which represents a transmit power mode in normal operation, typically the highest transmit power mode available for the devices. At step 704, the established network device 300 and the connecting network device 302 exchange a schema. The schema may be, for example, the output of a cyclic redundancy check, and can be an arbitrary single cyclic redundancy check code word. In accordance with an embodiment, the exchange of the schema in step 704 involves the established network device 300 sending a schema to the connecting network device 302, and the connecting network device returning the same schema or a derivation thereof. This sequence prevents unwanted third parties from interfering with an existing exchange.

At step 706, a determination is made whether there is a failure in the exchange of the schema, which typically would not occur in the first exchange when both of the devices are in normal power mode and the devices are functioning correctly. If a failure does not occur, then step 706 branches to step 708, where the transmit power level of the established network device 300 and the connecting network device 302 are both decremented, for example by the transmit power control modules 502, 508. The process then branches back to step 704.

This process continues, exchanging schema and decrementing the power level of each of the devices 300, 302, until the power is so low that there is a failure in reading the schema at step 706. This failure can be detected, for example, by the message error detection module 504 or 510.

Step 706 then branches to step 710, where the transmit power level for both devices 300, 302 is incremented. At step 712, schema is exchanged such as in step 704. At step 714, a determination is made as to whether there is a failure in the exchange of the schema. Again, like in step 706, this failure detection may be made by the message error detection module 504. If there is a failure, step 714 branches back to step 710, where the power level for each of the devices 300, 302 is incremented again. This process continues until there is not a failure at step 714, at which time step 714 branches to step 716 and the current power level of the two devices is set as the whisper mode of the two devices.

Figure 8:
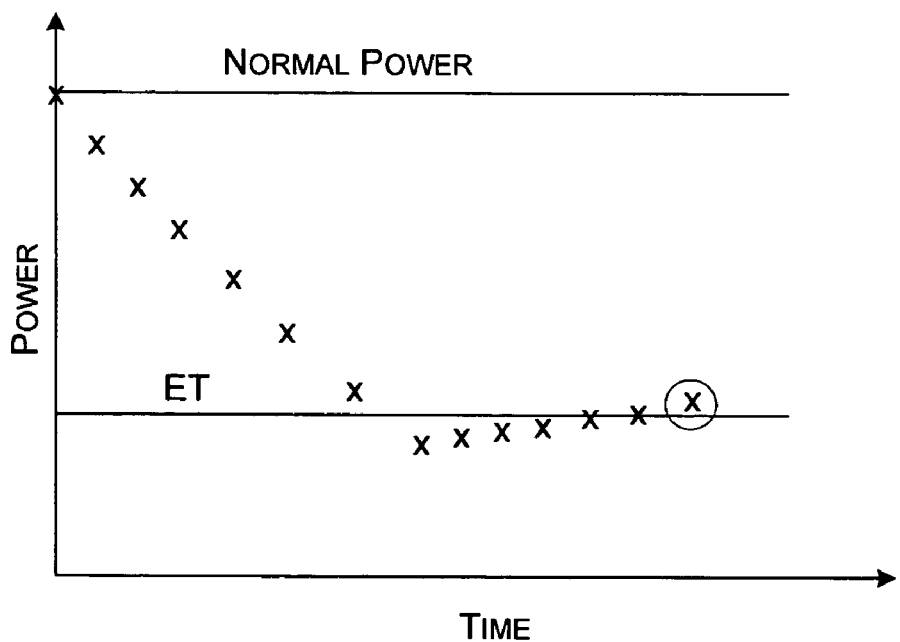
FIG. 8 is a graph representing power level versus time utilizing the method of FIG. 7.

The process of FIG. 7 is depicted graphically in FIG. 8. FIG. 8 is a graph representing power level versus time utilizing the method of FIG. 7. As can be seen in the drawing, as power level is decremented during steps 704 to 708, the power level decreases until it reaches a transmission error level TE. The process then reaches step 710, where the power level is incremented until, through the process of steps 710-714, the power level goes back above the transmission error level TE in the diagram. Utilizing this method, a sufficiently low error-rate transmission level slightly above transmission error level TE may be found, shown as a circled data point in FIG. 8. This successful power level that is slightly above the transmission error level TE may be utilized as the whisper mode in the process shown in FIG. 6.

If desired, the amount the transmit power is decremented in step 708 may be greater than the amount the transmit power is incremented in step 710. In this manner, power may be decremented at greater steps until a large transmission error rate occurs, allowing the process to proceed faster, and then incremented in small increments in an effort to find a sufficiently low error-rate power level as close as possible to the transmission error level TE. Incrementing at a smaller increment increases the chance that a smaller lower whisper mode level to be found. The larger decrements and smaller increments are depicted in FIG. 8.

Figure 9:
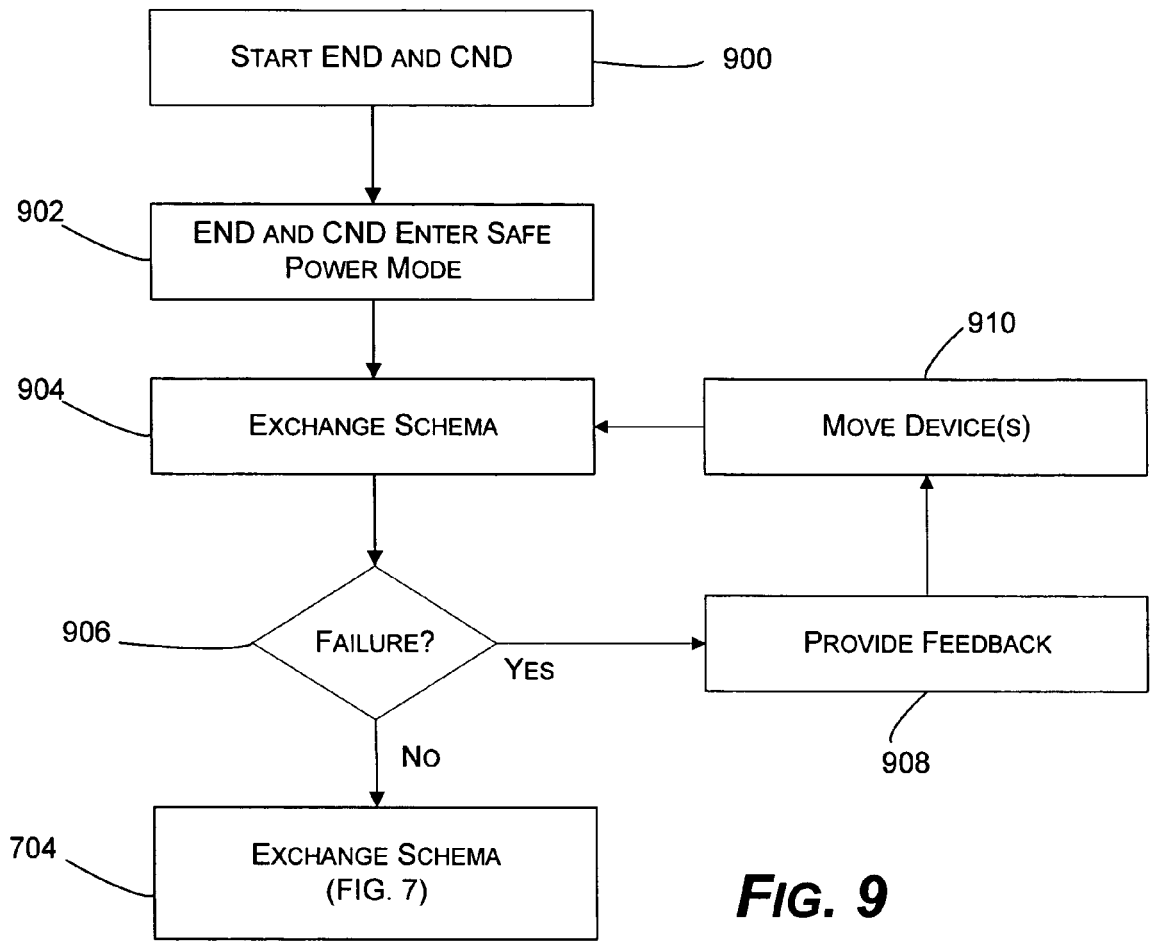
FIG. 9 is a flowchart generally representing steps for discovering whisper mode in accordance with an alternate embodiment of the invention.

Although the process depicted in FIG. 7 may be utilized, in accordance with an alternate embodiment of the invention, transmission does not begin at normal power mode. FIG. 9 is a flowchart generally representing steps for discovering whisper mode in accordance with an alternate embodiment of the invention that does not begin at normal power mode. In accordance with the process in FIG. 9, a safe power transmission mode is established, and the established network device 300 and the connecting network device 302 begin at this safe power mode. The safe power transmission mode represents a transmit power level that is generally safe for exchanging the secret information of step 604, and for example represents a power level corresponding to transmission of a safe distance, such as 2-3 meters. The safe power transmission mode may be established empirically, for example sufficient transmission power to transmit a signal two meters, or may be established through experimentation or another method. As can be appreciated, the closer the devices and the lower the transmission power therebetween, the less likely for interception and/or eavesdropping by unwanted third parties. Thus, a lower safe power transmission mode provides more protection against interception and/or eavesdropping.

In any event, beginning at step 900, the user begins the start sequence. At step 902, the network devices 300, 302 go into safe power mode. At step 904, the network devices 300, 302 exchange schema, similar to step 704. At step 906, a determination is made whether there is a failure (i.e., whether there is an error in received schema or the error rate is too high). If a failure occurs at this first attempt to exchange schema, then step 906 branches to step 908, where the user is provided feedback, for example, told to move the devices 300, 302 closer together. At step 910, the user moves the devices closer together, and the process then branches back to step 904. If there is not a failure, then step 906 branches to step 704 of FIG. 7. The process then proceeds as described with FIG. 7.

Figure 10:
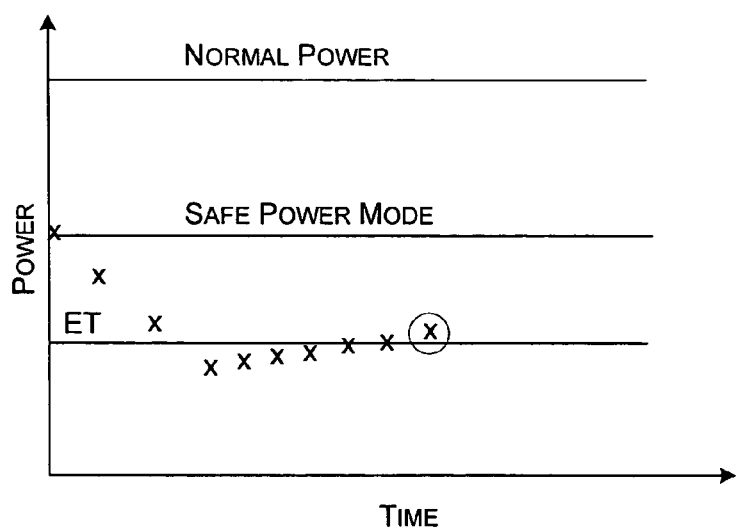
FIG. 10 is a graph representing power level versus time utilizing the method of FIG. 9.

FIG. 10 is a graph generally representing power versus time for the process of FIG. 9. As can be seen, the process is very similar to the process shown in FIG. 8, except that the process begins at a lower power setting, i.e., the safe power mode (SP).

Figure 11:
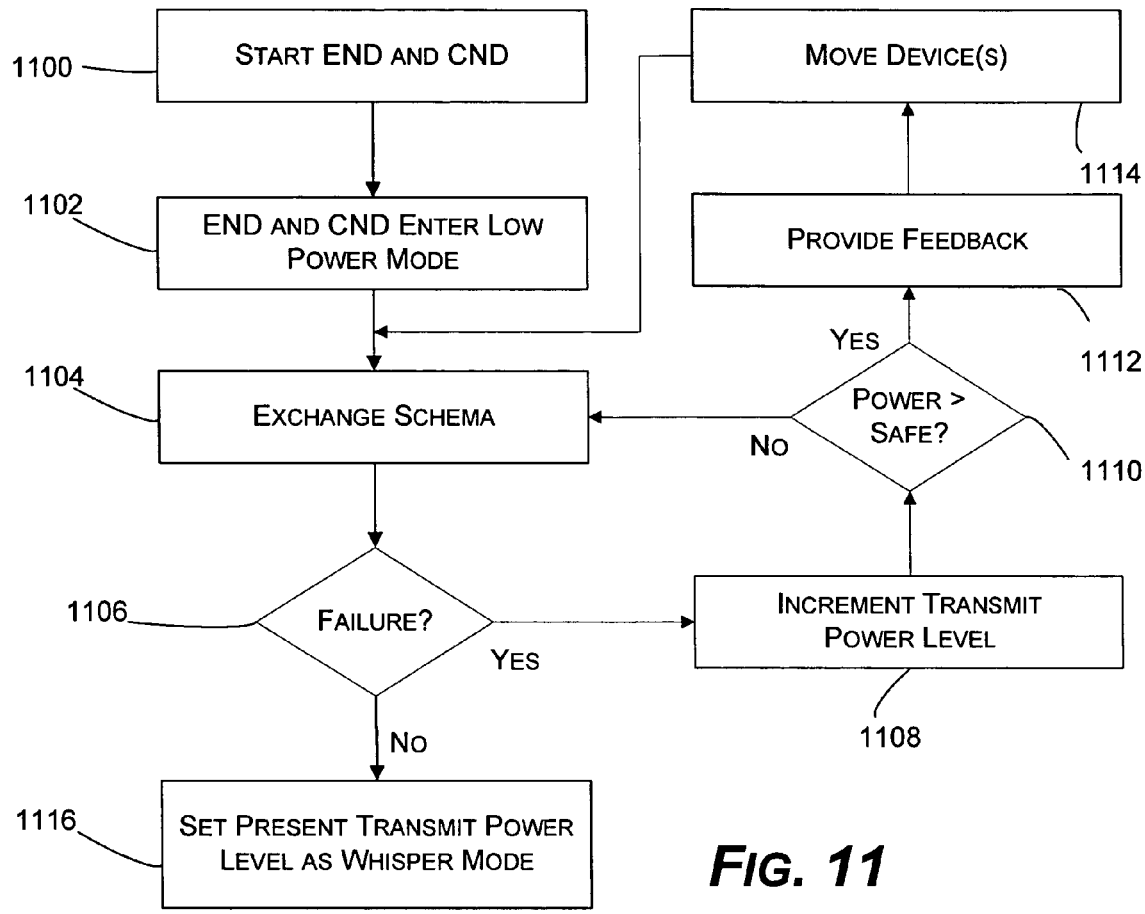
FIG. 11 is a flowchart generally representing steps for discovering whisper mode in accordance with yet another embodiment of the invention.

FIG. 11 is a flowchart depicting yet another method for discovering whisper mode in accordance with an embodiment of the invention. In accordance with the process depicted in FIG. 11, the initial transmission power level is set at a low setting and then incremented upward. This process even further avoids the possibility of too high of a power level during the discovery process, further preventing unwanted third parties from intercepting the secret information or otherwise interfering in the process.

Beginning at step 1100, the user starts the process, such as in steps 700 and 900 of FIGS. 7 and 9. At step 1102, the established network device 300 and the connecting network device 302 are set at a low power setting, for example the lowest power settings for the devices. At step 1104, schema is exchanged. At step 1106, a determination is made whether failure occurred in the schema exchange. If so, the power level is incremented at step 1108. At step 1110, a determination is made whether the power level is above a safe mode. This safe mode may be established similar to the safe mode in FIG. 9, and represents a power level above which discovery is not permitted. This process provides a safety feature preventing the devices from continuing to attempt to exchange schema at a power level deemed risky by the developer.

If the power level has not exceeded the safe mode, then step 1110 branches back to step 1104, where the process continues to increment the power level through step 1104-1108. If the safe mode has been exceeded, then step 1110 branches to step 1112, where feedback is provided to the user, for example to move the devices closer together. At step 1114, the user moves the devices closer together and the process then branches back to step 1104. At the point at which the failure is no longer reached on the exchange of schema, step 1106 branches to step 1116, where the present power levels of the devices 300, 302 are set as the whisper mode.

Figure 12:
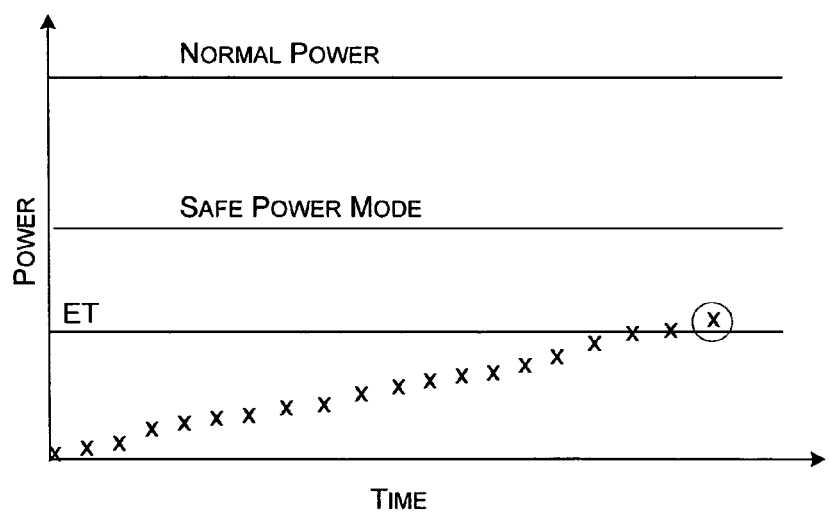
FIG. 12 is a graph representing power level versus time utilizing the method of FIG. 11.

The process of FIG. 11 is depicted graphically in FIG. 12. As can be seen, the power level increments upward until it exceeds an error transmission level (ET), at which point whisper mode is set. If the process had continued up to above a safe power level (SP) without a sufficiently low error-rate transmission, then the feedback of steps 1112 and 1114 would be provided.

Figure 13:
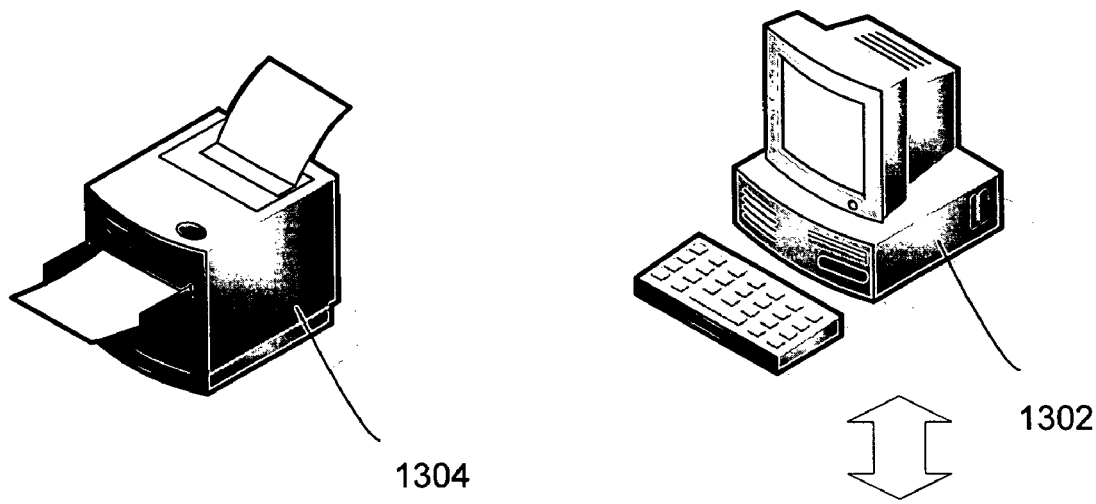
FIG. 13 is a diagram representing a connection being established by an intermediary device to an established network device in accordance with an embodiment of the invention.

In accordance with an embodiment, as shown in FIG. 13, an intermediary device 1300 may be utilized for performing the methods of the inventions. As an example, a connecting network device, such as a printer 1304, may seek connection to a wireless network to which an established network device, such as a computer 1302 is already connected. However, movement of the two devices 1302, 1304 to close proximity may be difficult. Therefore, in accordance with an embodiment, the intermediary device 1300 may be utilized for provisioning the connecting network device 1304.

Figure 14:
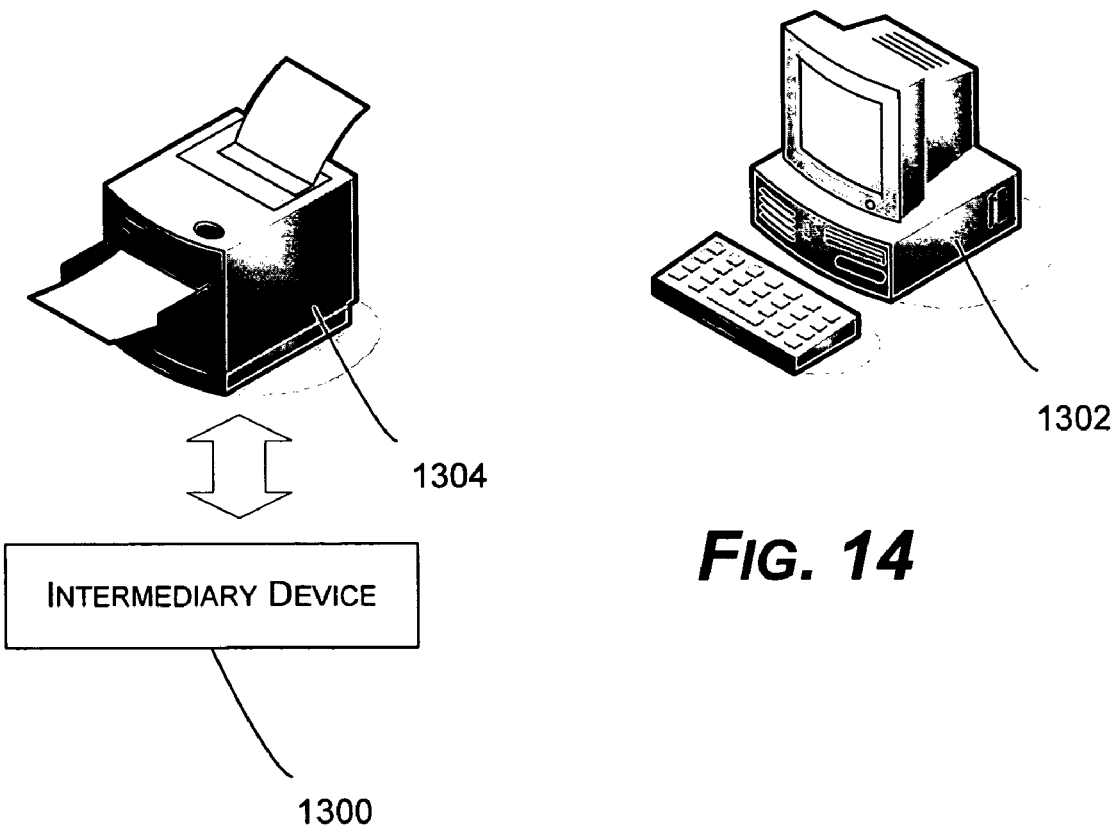
FIG. 14 is a diagram, similar to FIG. 13, representing connection by the intermediary device to a connecting network device in accordance with an embodiment of the invention.

The intermediary device 1300 preferably includes the wireless network software, such as the wireless network software 500, so that it may perform the wireless mode detection and secret information exchange shown in FIG. 6. That is, the intermediary device 1300 may receive the information from the established network device 1302 (FIG. 13) and then transmit that information to the connecting network device 1304 (FIG. 14). Both of these transmissions may be done wirelessly using the method of FIG. 6, or one or the other may be done via a hardwired connection. For example, the intermediary device 1300 may include a USB connection, and may connect to the established network device 1302 via the USB connection, receive the secret information through the USB connection, and then provide the secret message to the connecting network device 1304 utilizing the wireless provisioning in FIG. 6.

Figure 15:
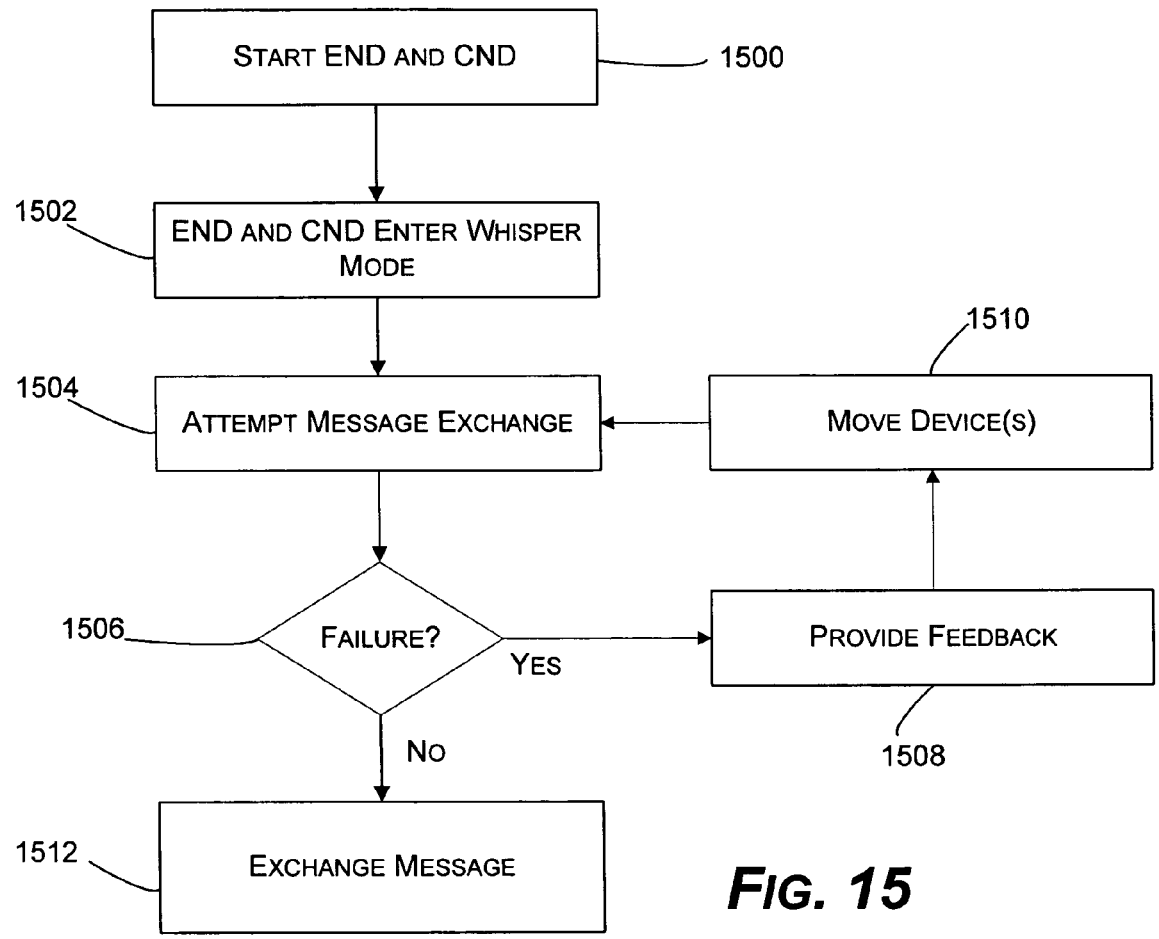
FIG. 15 is a flowchart depicting a method in which whisper mode is preset for devices in accordance with an embodiment of the invention.

FIG. 15 is a flowchart depicting a method in which whisper mode is preset for devices in accordance with an embodiment of the invention. In accordance with the process depicted in FIG. 15, the whisper mode is set prior to use by a user, for example by a manufacturer. The manufacturer may, for example, determine a whisper mode empirically, for example sufficient transmission power to transmit a signal two meters, or whisper mode may be established through experimentation or another method.

Beginning at step 1500, the user starts the process, such as in steps 700 and 900 of FIGS. 7 and 9. At step 1502, the established network device 300 and the connecting network device 302 are set at whisper mode. The devices may, for example, start at a normal power level to discover each other and then switch to preset whisper mode, or one or both of the established network device 300 and the connecting network device 302 may start in whisper mode. The connecting network device 302 may, in another example, always operate in whisper mode.

At step 1504, an exchange of secret information is attempted. At step 1506, a determination is made whether failure occurred in the exchange. If so, then step 1506 branches to step 1508, where feedback is provided to the user, for example to move the devices closer together. At step 1510, the user moves the devices closer together and the process then branches back to step 1504. At the point at which the failure is no longer reached on the exchange, step 1506 branches to step 1512, where the secret information is exchanged.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-readable medium having thereon computer-executable instructions for performing a method comprising:
   operating a first device in a first mode;
   activating an indicator to operate the first device in a second mode; and
   operating the first device in the second mode, the second mode having a low transmit power setting for the first device that is sufficient for a wireless exchange of messages between the first device and a second device, the second device having access to secret information, wherein operating the first device in the second mode comprises:

attempting to exchange a schema in a first schema exchange at a safe power transmit level, when the first schema exchange is successful, decrementing transmit power of the first device and exchanging schema in a further schema exchange until the further schema exchange is unsuccessful, wherein the safe power transmit level is a power level for which successful exchange of the first schema between the first device and the second device is only expected when a distance between the first device and the second device is less than a maximum safe distance, the maximum safe distance being no greater than three meters, and when the first schema exchange is not successful, providing feedback to a user that the first device needs to be placed in closer proximity to the second device;

once a further schema exchange is unsuccessful, incrementing transmit power and exchanging schema again until a schema exchange is successful at a first transmit power level; and setting the first transmit power level as the low transmit power setting;

wherein schema is selected from a group consisting of an output of a cyclic redundancy check and a cyclic redundancy check codeword;

wherein the decrementing comprises decreasing the transmit power by a first amount and the incrementing comprises increasing the transmit power by a second amount, the first amount being greater than the second amount;

setting the transmit power of the first device to the low transmit power setting; and receiving the secret information from the second device via wireless media while at the low transmit power setting, wherein the first mode is associated with a first transmit power setting different than the low transmit power setting associated with the second mode.

2. The computer-readable medium of claim 1, wherein the first transmit power setting comprises a normal transmit power setting of the first device.

3. The computer-readable medium of claim 1, wherein the first transmit power setting comprises a lowest transmit power setting of the first device.

4. The computer-readable medium of claim 1, further comprising, if the transmit power of the first device is incremented above the safe power transmit level without a successful schema exchange, providing feedback to a user that the first device needs to be placed in closer proximity to the second device.

5. The computer-readable medium of claim 1, wherein the secret information comprises at least one of connection settings or a password for connecting to a wireless network.

6. The computer-readable medium of claim 5, further comprising:

utilizing said at least one of connection settings or a password for connecting to a wireless network; and automatically configuring the first device to connect to the wireless network.

7. The computer-readable medium of claim 1, wherein the second device is an intermediary device that receives the secret information from a third device.

8. The computer-readable medium of claim 1, wherein the first device is an intermediary device, and further comprising supplying the secret information to a third device from the first device.

9. A computer-readable medium having thereon computer-executable instructions for performing a method comprising:

operating a first device in a first mode;

activating an indicator to operate the first device in a second mode; and operating the first device in the second mode, the second mode having a low transmit power setting for the first device that is sufficient for a wireless exchange of messages between the first device and a second device, the second device having access to credentials and other settings for connecting to a wireless network, wherein operating the first device in the second mode comprises:

attempting to exchange a schema in a first schema exchange at a safe power transmit level, and if the first schema exchange is successful, decrementing transmit power of the first device and exchanging schema in a further schema exchange until the further schema exchange is unsuccessful, wherein the safe power transmit level is a power level for which it has been determined that successful exchange of the first schema between the first device and the second device is only expected when a distance between the first device and the second device is less than a predetermined maximum safe distance;

once a schema exchange is unsuccessful, incrementing transmit power and exchanging schema again until a schema exchange is successful at a first transmit power level; and setting the first transmit power level as the low transmit power setting;

wherein schema is selected from a group consisting of an output of a cyclic redundancy check and a cyclic redundancy check codeword;

setting the transmit power of the first device to the low transmit power setting;

receiving the credentials at the first device from the second device via wireless media while at the low transmit power setting; and utilizing the credentials at the first device to configure the first device to connect to the wireless network, wherein the first mode is associated with a first transmit power setting greater than the low transmit power setting associated with the second mode.

10. The computer-readable medium of claim 9, further comprising, if the first schema exchange is not successful, providing feedback to a user that the first device needs to be placed in closer proximity to the second device.

11. The computer-readable medium of claim 9, wherein the first transmit power setting comprises one of a normal transmit power setting of the first device or a safe transmit power setting of the first device, the safe transmit power setting being lower than the normal transmit power setting of the first device.

12. The computer-readable medium of claim 9, wherein the first transmit power setting comprises a lowest transmit power setting of the first device.

13. The computer-readable medium of claim 9, further comprising, if the transmit power of the first device is incremented above the safe power transmit level without a successful schema exchange, providing feedback to a user that the first device needs to be placed in closer proximity to the second device.

14. The computer-readable medium of claim 9, wherein the predetermined maximum safe distance is no greater than two meters.

15. The computer-readable medium of claim 1, wherein the safe power transmit level is determined experimentally.

16. The computer-readable medium of claim 9, wherein the predetermined maximum safe distance is three meters.

17. The computer-readable medium of claim 15, wherein the safe power transmit level is determined experimentally for the predetermined maximum safe distance.

* * * * *